Aug. 28, 1945. H. G. ROBINSON 2,383,741
METHOD AND MEANS FOR CUTTING OFF MATERIAL ABRASIVELY
Filed July 28, 1943 2 Sheets-Sheet 1
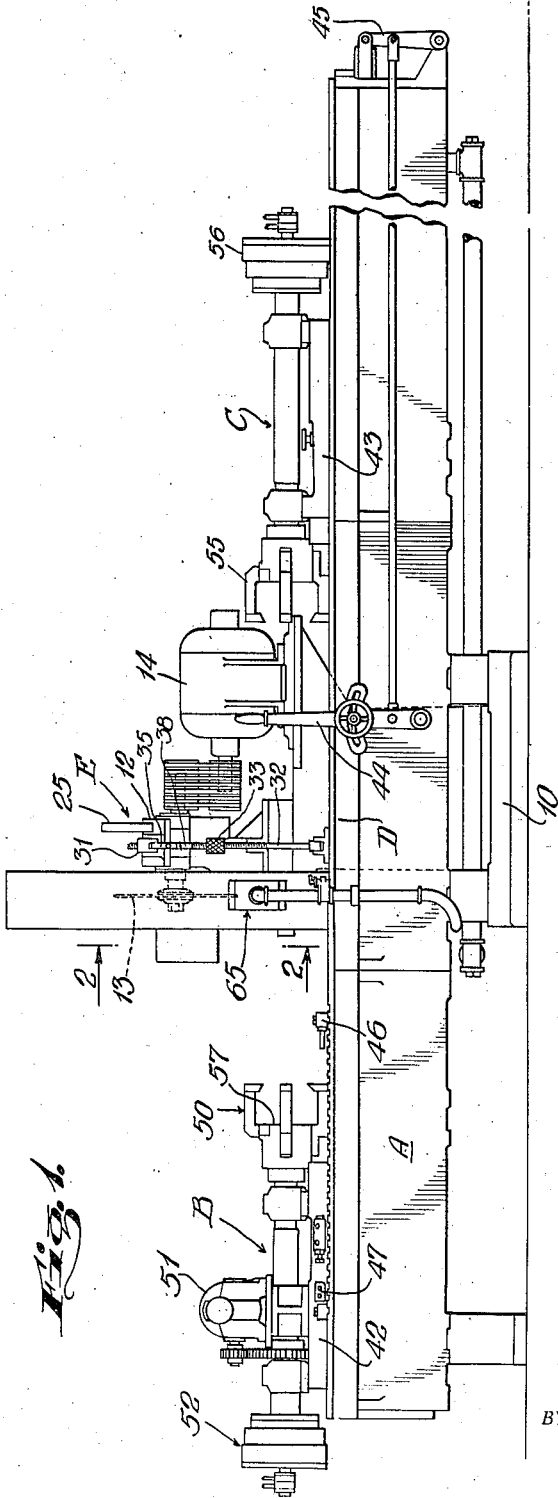
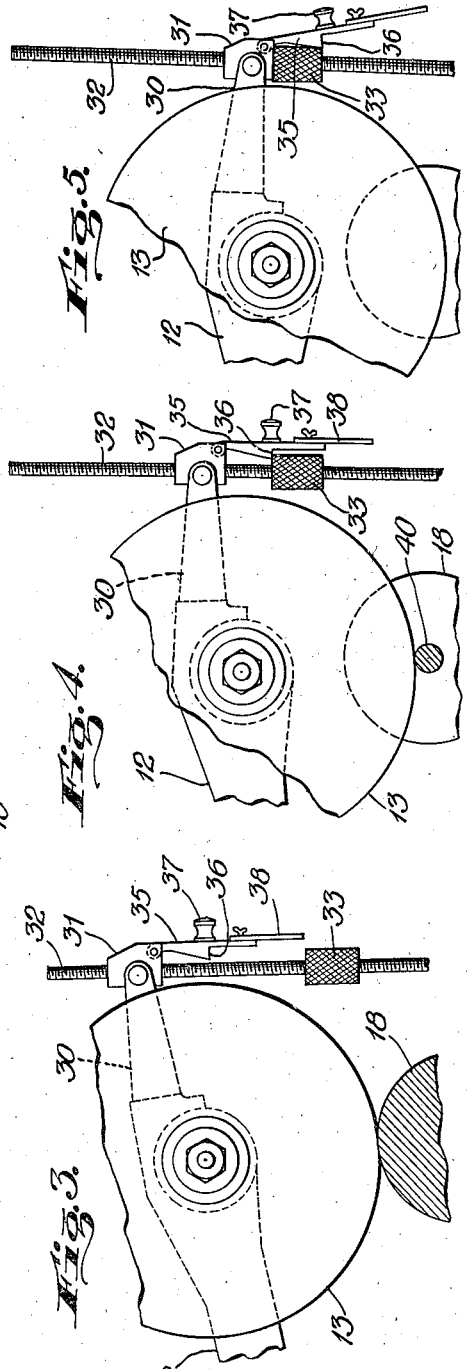
INVENTOR
HARRY G. ROBINSON
BY
ATTORNEY

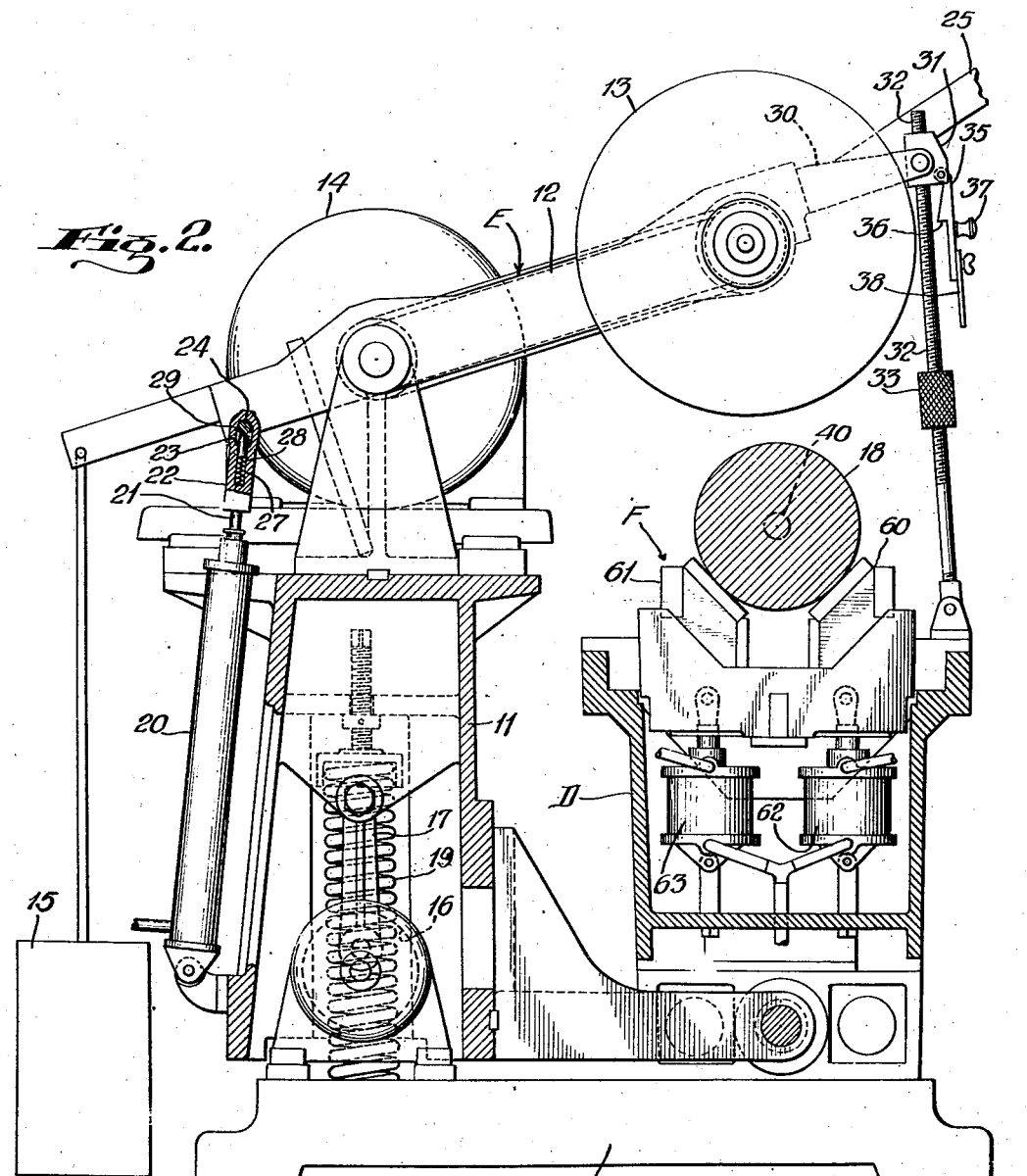

Patented Aug. 28, 1945

2,383,741

UNITED STATES PATENT OFFICE 2,383,741

METHOD AND MEANS FOR CUTTING OFF MATERIAL ABRASIVELY

Harry G. Robinson, Stratford, Conn., assignor to American Chain & Cable Company, Inc., New York, N. Y. a corporation of New York Application July 28, 1943, Serial No. 496,679

8 Claims. (Cl. 51—33)

This invention relates to method and means for cutting material off abrasively.

Among the objects of this invention are improved method and means for cutting off abrasively material of much heavier stock than heretofore possible to be cut off abrasively; to provide for cutting off sections of uniform length and volume and shape and in providing for the accomplishment of these objects, improved means for feeding the cutoff disc against the work bar, improved means for rotating the work bar and operating the cutoff disc, and improved means for assuring production of a finished article of correct shape, length and volume at a rapid rate and with much less wear on the cutoff disc and much cheaper than heretofore possible.

Other objects of the invention will appear from the following description taken in connection with the drawings in which—

Fig. 1 is a front elevational view of a machine embodying this invention;

Fig. 2 is a cross sectional view on the line 2—2 of Fig. 1;

Fig. 3 is a side view of the cutoff disc and feed control means as the cutoff disc engages the work bar;

Fig. 4 is a similar view of the cutoff disc in its first arrested position; and

Fig. 5 is a similar view of the cutoff disc in its final arrested position.

The machine includes a relatively long table or bed frame A on which are supported carriages B and C for handling the material to be cut and it also includes a frame member D on which is supported the cutoff mechanism E and the jacks F for supporting the work bar as a section is being cut off. The machine also includes hydraulic pressure producing mechanism; pressure controlling means; pressure fluid by-passing means; and manipulative means for controlling the same not disclosed. Various manipulative controls, not disclosed, may be provided for operating the various mechanisms of the machine in a desired sequence and if desired certain of the several mechanisms in the machine may be operated sequentially by automatic control means.

Pivotally supported on the base 10 of the frame D Fig. 2 is a generally L-shaped frame member 11 provided with brackets on which is pivotally supported a cutoff disc supporting arm 12 in the forward end of which is journalled a cutoff disc 13. The cutoff disc 13 may be driven through belting from a motor 14 located in line with the pivot of the supporting arm 12 as is well understood by those familiar with machines of this type. The disc 13 may be counterbalanced by a weight 15.

The frame member 11 is rocked about its pivot as is well known by a motor driven eccentric or crank disc 16 connected by a link to the member 11, to oscillate the disc 13 horizontally back and forth across the work bar indicated at 18. A spring 19 may be provided to cushion the frame member 11 on its return movement into the position shown in Fig. 2.

The cutoff disc supporting arm 12 is rocked by a hydraulic means comprising a cylinder 20 and a piston 21 provided with a head 22 slotted as indicated at 23 to receive a pin 24 on the arm 12. Fluid admitted into the cylinder 20 rocks the cutoff disc into contact with the work bar and feeds it through the work bar. The cutoff disc however may be brought into contact with the work bar by a handle 25. For the purpose of cushioning the feeding movement of the cutoff disc as it engages the work bar, the head 22 of the piston 21 may be recessed as indicated at 27 to receive a spring 28 supporting a plunger 29 which engages the pin 24 on the arm 12. By means of this construction the feeding means can yield to follow the eccentric or non-circular contour of the rotating work bar 18 until a notch has been cut into the circumference of the work bar after which the feeding means will be operated by solid fluid pressure.

Provision is made for rotating the work bar 18 which will be described later. In order that the feeding mechanism may be arrested before the work bar has been completely severed the forward end of the arm 12 is provided with an extension 30 to which is pivoted a block 31 provided with a hole through which freely extends a threaded rod 32 pivoted at its lower end on the frame member D. Threaded on this rod is an adjusting sleeve or stop block 33, made adjustable in order that it may act as a stop to arrest the feeding mechanism before the work bar is completely severed and later after the work bar has been completely severed. Cooperating with this stop block 33 is an arm 35 pivoted on the block 31 and provided with a shoulder 36, a manipulative means 37 and a gauge plate 38 readily detachable therefrom and replaceable by other gauge plates provided for gauging the length of feeding movement of the cutoff disc for work bars of different diameters.

When a work bar of a particular diameter is to be cut, the proper gauge plate 38 is connected to the pivoted arm 35 and the block 33 is adjusted to bring its upper end into the horizontal plane of the lower end of the gauge plate 38 as shown in Fig. 3. When the machine is operated the frame 12 will be rocked to carry the cutoff disc into contact with the work bar and after the cutoff disc has cut the work bar to a point indicated at 40 the shoulder 36 will engage the stop block 33 and arrest the feeding movement of the cutoff disc. After the rotation of the work bar has been stopped and the jack blocks F have been raised into contact with the work bar as indicated in Fig. 2 the stop shoulder 36 will be withdrawn from the block 33 by means of the manipulative means 37 and the feeding movement of the cutoff disc will resume to cut off the work bar and until it is arrested by engagement of the block 31 with the stop block 33.

Fig. 1 discloses the work bar supporting table A and chuck mechanisms B and C mounted on sliding blocks 42 and 43. The sliding block 43 may be operated by a manipulative means 44 and leverage connections 45 as indicated in Fig. 1. The sliding block 42 may be operated in any desired manner its forward and rearward positions being limited and defined by the positions of adjustable blocks 46 and 47, the block 46 being positioned to gauge the length of the sections to be cut off.

A chuck 50 is rotatably supported on the sliding block 42 and may be rotated by a motor 51. The jaws of this chuck may be moved into open and closed position by fluid pressure mechanism generally indicated at 52. The chuck 55 is rotatively mounted on the sliding block 43 and its jaws may be opened and closed by similar fluid pressure means 56 as indicated if desired but as this chuck engages the rear end of the work bar which in many instances is many feet long, its jaws may be manually and individually adjustable. The chuck 50 is provided with a stop face 57 against which the work bar is stopped to gauge the length of the section to be cut off.

The jack mechanism F in Fig. 2 comprises two sliding jack blocks 60 and 61 slidably mounted in the frame D and provided with oppositely inclined work bar engaging faces as disclosed. The jack blocks are operated by fluid pressure piston and cylinder devices 62 and 63 which are supplied through a common pipe from a source of fluid pressure in order that they may rise different amounts if necessary to engage the work bar in case the work bar is out of round or curved longitudinally.

Liquid coolant may be applied to the cutoff through any well known means such as disclosed at 65 in Fig. 1 to which it may be supplied by a liquid coolant pump not disclosed.

*Operation*

The proper sequence of the operation of the machine is as follows. The motor driving the cutoff disc, the coolant pump motor and the hydraulic motor are set in operation and they run continuously. After the work bar to be cut is placed in the machine one of its ends is centered and secured in the rotating chuck 55 which is not power driven. The work bar is fed underneath the cutoff disc and is supported by the hydraulic jacks which are shaped like V blocks. The work bar is fed along a certain distance which is not fixed. The left hand chuck 50 which is power driven is then moved toward the right up to the fixed stop 46. This chuck has a stop 57 in it against which the work bar is fed by moving the right hand chuck 55 further toward the left. The chuck jaws of the chuck 50 are then closed and the jacks 60 and 61 are lowered out of contact with the work bar. The work bar is then rotated and the cutoff disc is fed downward. When the cutoff disc engages the work bar it is held against the work to follow the contour of the work by the spring 27 on the rear end of the arm 12.

The hydraulic feed of the arm 12 is continuous but is not effective until the spring has been entirely overcome at which point there is a solid connection between the piston 21 of the hydraulic feed cylinder 20 and the arm 12. The cutoff disc then is continuously and positively fed downward until it is mechanically stopped by the engagement of the shoulder 36 with the block 33 as indicated in Fig. 4. When the operator sees the shoulder 36 solidly engaging the block 33 the rotation of the work bar is stopped and the jacks are raised to support the work bar. The jacks are prevented from going up too high by engagement with that portion of the work bar that is held in the power driven rotating chuck 50. The shoulder 36 is then withdrawn from the block 33 and the feeding of the cutoff disc is automatically resumed to cut through the center of the work bar and this feeding movement is then arrested by engagement of the block 31 with the block 33 as indicated in Fig. 5. When this occurs the cutoff disc is returned to its starting position. The left hand chuck is then withdrawn and opened and the cut off piece is removed. This covers one cycle of operation of the machine.

While I have described my improved method with reference to a preferred embodiment of my improved means of cutting off sections from a work bar, it is to be understood I reserve the right to all such changes in the method and means as fall within the principle of this invention and the scope of the appended claims.

I claim:

1. The method of cutting off material abrasively which consists in rotating the work, in engaging a rotating cutoff disc yieldingly with the work to score the work and then in positively feeding the cutoff disc into the work, arresting the feeding movement of the cutoff disc to prevent complete severance of the work, stopping the rotation of the work, supporting the work in the cutting region on each side of the cutoff disc, resuming the feeding operation of the cutoff disc to sever the work and stopping the feeding movement of the cutoff disc and returning the same to its home position.

2. The method of cutting off material abrasively which consists in rotating the work, in engaging a rotating cutoff disc yieldingly with the work to score the work and then in positively feeding the cutoff disc into the work, arresting the feeding movement of the cutoff disc to prevent complete severance of the work, stopping the rotation of the work, supporting the work in the cutting region on each side of the cutoff disc, resuming the feeding operation of the cutoff disc to sever the work and stopping the feeding movement of the cutoff disc and returning the same to its home position, and oscillating said cutoff disc transversely of the work as it engages and is fed into and through the work.

3. The method of cutting off metallic material transversely which consists in rotating the work, in feeding a rotating abrasive cutoff disc into and through the work, and in oscillating the cutoff disc transversely of the work as it engages and is fed through the work.

4. The combination of a cutoff disc, a support therefor, means moving said support to feed the cutoff disc against and through the work comprising positive operating means and a yielding connection between said operating means and said support for said cutoff disc.

5. The combination of a rotatable work support, a cutoff disc, a support therefor, means for moving said latter support to carry the disc against the work and through the work, means for arresting the feeding of said disc at a point close to the center of said work, and means for disabling said last mentioned means to permit said feeding means to resume feeding of said disc.

6. The combination of a rotatable work support, a cutoff disc, a support therefor, means for moving said latter support to carry the disc against the work and through the work, means for arresting the feeding of said disc at a point close to the center of said work, means for stopping the rotation of the work, and means for disabling said feed arresting means to permit said feeding means to resume feeding of said disc.

7. The combination of a rotatable work support, a cutoff disc, a support therefor, means for moving said latter support to carry the disc against the work and through the work, means for arresting the feeding of said disc at a point close to the center of said work, means for stopping rotation of the work, means for supporting said work on opposite sides of the slot cut into said work, and means for disabling said feed arresting means to permit said feeding means to resume feeding of said disc.

8. In a machine for cutting off work of metallic material, the combination of a rotatable abrasive cutoff disc, means for rotating the work, means for feeding the disc against and through the work and means for oscillating said disc transversely of said work.

HARRY G. ROBINSON.